United States Patent [19]
Baer

[11] 3,993,861
[45] Nov. 23, 1976

[54] DIGITAL VIDEO MODULATION AND DEMODULATION SYSTEM

[75] Inventor: Ralph H. Baer, Manchester, N.H.

[73] Assignee: Sanders Associates, Inc., South Nashua, N.H.

[22] Filed: Mar. 24, 1975

[21] Appl. No.: 561,131

[52] U.S. Cl. .............................. 178/5.6; 178/DIG. 1
[51] Int. Cl.[2] ......................................... H04N 7/00
[58] Field of Search ......... 178/5.6, DIG. 1, DIG. 23, 178/DIG. 35, DIG. 38

[56] References Cited
UNITED STATES PATENTS

| | | | |
|---|---|---|---|
| 3,369,073 | 2/1968 | Scholz .................................. | 178/5.6 |
| 3,493,674 | 2/1970 | Houghton ............................. | 178/5.6 |
| 3,663,937 | 5/1972 | Bolner ............................ | 178/DIG. 1 |
| 3,728,480 | 4/1973 | Baer ............................... | 178/DIG. 1 |
| 3,737,566 | 6/1973 | Baer et al .......................... | 178/5.8 R |
| 3,743,767 | 7/1973 | Bitzer et al. .................. | 178/DIG. 23 |
| 3,891,792 | 6/1975 | Kimura ............................. | 178/5.6 X |
| 3,900,887 | 8/1975 | Soga et al. .................... | 178/DIG. 23 |

*Primary Examiner*—Richard Murray
*Assistant Examiner*—Aristotelis M. Psitos
*Attorney, Agent, or Firm*—Louis Etlinger; Richard I. Seligman

[57] ABSTRACT

In a television system, a digital video system permits the transmission of data along with the usual television picture. The television picture field includes one or more selectively addressable areas and the data is imprissed on these areas as digital, binary-coded brightness modulations at rates greater than the vertical field rate. At the receiving end of the system, the viewer positions one or more light sensors opposite these screen areas. The light sensors respond to the binary-coded brightness modulations by developing corresponding binary-coded digital electrical signals. The data stream from a light sensor can then be decoded by a demodulator/decoder operated by the viewer.

18 Claims, 6 Drawing Figures

DIGITAL VIDEO MODULATION AND DEMODULATION SYSTEM

BACKGROUND OF THE INVENTION

This invention relates generally to a television entertainment, education and training system. It relates more particularly to a system of that type which permits a standard television system to transmit digital, binary-coded data to the viewers along with the usual television picture. Alternatively, this program material can be contained on prerecorded tape and either broad or cable-cast, or directly played back by the viewer using a video playback machine.

Considerable thought and attention is being given to the use of television systems as an educational and training tool. This is because on the one hand, a single television broadcast can reach a very large number of people. Consequently, the "per pupil" cost of a particular television course is relatively low. Also, this arrangement permits many viewers to have the advantage of receiving instruction from the very best teachers. On the other hand, use of prerecorded video tape can bring personalized one-on-one teaching to a student.

To optimize the benefits to the viewers from the various courses, contests, training exercises, etc. offered by the television or video tape program originator, it is desirable that the individual viewer be able to interact with the program. To this end, it has been proposed that the program or transmitting facility send certain data to the viewers pertaining to the program without interfering with the program picture. One way of accomplishing this is to send the data as coded brightness modulation in small dedicated areas of the television picture frame as disclosed in U.S. Pat. No. 3,737,566 assigned to the assignee of the present application. The present invention pertains to a system of that general type.

As disclosed in the aforesaid patent, in a television course including a multiple choice quiz, for example, the correct quiz answers can be "tagged" by impressing unique brightness modulations in squares associated with the correct answers. However, the tagging of correct answers in that fashion involves the transmission of only a small amount of data. In many instances, it is desirable for the program originator to be able to send much more data to properly train or assist the individual program viewer, through his TV set or monitor and, possibly, other associated devices. To be practical, this must be accomplished without altering the standard television signal and without unduly obstructing the TV picture. If properly done, the brightness, binary-coded, high speed digital modulation must not only be unobtrusive to the casual viewer but should induce him to avail himself of the full benefit of the program he is watching by interactive participation using the appropriate equipment.

SUMMARY OF THE INVENTION

Accordingly, it is an object of this invention to provide a television entertainment, education and training system which permits a cooperating television station to send pertinent binary-coded, digital data to viewers of a television program originating at the station without interfering with the TV picture.

It is a further object of this invention to provide a system of the above type which permits a standard television transmitting facility to send relatively large amounts of data as binary-coded, digital brightness modulations in selected areas of the television picture frame.

It is another object of this invention to provide such a system which permits the transmission of high speed, binary-coded, digital data on a standard television signal without requiring any increase in the signal bandwidth.

It is yet another object of this invention to provide binary-coded, digital data to permit a video entertainment system which is relatively inexpensive to make and simple to incorporate into a standard television system.

It is a still further object of this invention to provide a digital video accessory which permits a television (broadcast or cable) system to transmit high speed, binary-coded, digital brightness modulation which is readily detectable by the viewers using relatively inexpensive light sensing equipment.

It is another object of this invention to accomplish all of these functions using a prerecorded video tape or disc either for direct playback at the viewing location or for broadcast over a TV or CATV transmitter.

Briefly, the present invention includes a system which transmits, along with the usual television picture, data in the form of binary-coded, digital brightness modulation at rates exceeding the vertical picture field rate in one or more selected areas or cells of the television picture. At the receiving end of the system, this binary-coded, digital information is detected by positioning one or more light sensors opposite these cells. The sensors respond by developing corresponding digital, electrical signals which are then decoded to apprise the viewer of the transmitted message or are applied to external equipment such as a calculator, a computer, a tape recorder, a CRT display, a hard copy machine or other devices appropriate for the particular occasion. Photosensors may be hand held light pens or may be semi-permanently attached to a specific area on the CRT face plate.

To maximize the amount of data that can be transmitted in this fashion, the television picture frame can be thought of as being divided conceptually into a relatively large number of small areas or cells, the exact number of cells depending upon the amount and type of information to be transmitted to the viewers. In actual fact, any number of cells can be used in any location whatsoever, providing the resultant light spot on the TV screen is not too small to be sensed by a photocell.

In the simplest form of this method of binary data transmission, a binary-coded, digital data generator is associated with each cell at the transmitting or program origination facility. A cell selection matrix or horizontal and vertical positioning controls are applied to each data generator so that the digital data for each cell produces a video signal for that cell at a rate of one bit per picture field. Thus, the brightness of each cell may be individually digitally modulated to provide a unique data stream associated with that cell. Transmission of increased data is achieved by causing each line segment of a cell to represent a data bit (logical ONE or ZERO). Information transfer rate is further increased by segmenting each line segment of a cell into a plurality of data bits.

A light sensor positioned by the viewer against the screen of his television receiver opposite a particular cell, or held there by a fastener such as a suction cup, thus receives intensity-modulated signals in accordance with the data stored in the data generator associated with that cell. The sensor develops correspondingly binary-coded, digital electrical signals which can e decoded to apprise the viewer of the transmitted message.

Accordingly, this arrangement permits the cooperating transmitting facility or taped program to communicate a relatively large amount of digital information to the program viewers in addition to the pictorial matter, without requiring any change in its normal operating procedures and without requiring any increase in the signal bandwidth to accommodate the additional data being sent to the viewers.

Further, the components of the subject digital video entertainment or education system are readily available and easily assembled and installed at the transmitting or taped-program origination facility. Accordingly, the cost to the facility of obtaining this additional instruction capability should not be excessive.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENTS

Figure 1:
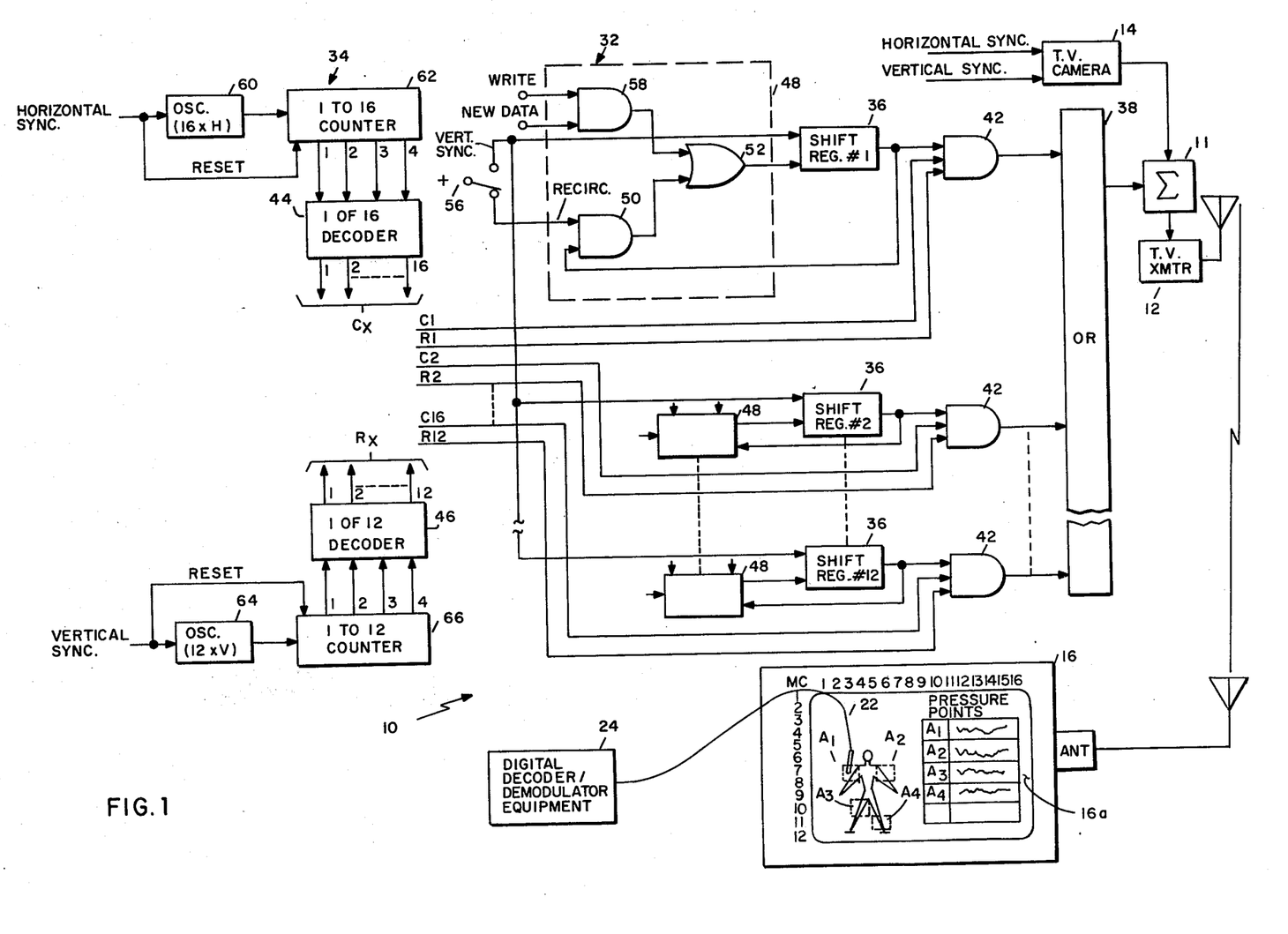
FIG. 1 is a block diagram of an elementary system for transmitting binary-coded, digital data shown by way of example in conjunction with a standard television transmitting and receiving equipment.

Turning now to FIG. 1, the subject digital video data transmission system is indicated generally at 10. The output of the system is applied via summing network 11 to a conventional television transmitter 12, along with the video signals from a standard TV camera 14. Both the system 10 and camera 14 are synchronized by the usual horizontal and vertical synchronication signals generated at the transmitting facility.

The system 10 develops binary-coded, digital data signals which are associated with one or more selected areas or cells in the television picture frame. These coded signals are summed with the video output from camera 14 so they are present in the modulated carrier signal sent by the transmitter 12.

The transmitted signal is received by a standard monochrome or color television receiver 16. Alternately, the transmission can also be sent by a closed circuit or cable television facility, or be recorded on video tape for later playback into a standard TV receiver or video monitor.

The binary-coded, digital data appears on the television receiver screen 16a as coded brightness modulation, or a flickering white spot in the selected areas or cells in the picture frame. In the illustrated embodiment, there are four cells $A_1$ to $A_4$. These flickering cells are superimposed on the conventional television picture developed by camera 14.

In the illustration, the background picture is a simulated human body and the cells $A_1$ to $A_4$ are intended to identify certain pressure points for limiting blood flow to certain parts of the body. The picture is being displayed in connection with a training exercise on blood circulation conducted by the cooperating transmitting facility.

The viewer detects the binary coded brightness modulation or flicker by placing a light sensor 22 against the screen 16a opposite one of the cells, for example, cell $A_1$. The light sensor responds to the brightness modulation in the cell opposite it by developing corresponding digital electrical signals. These signals are then applied to a decoder 24 shown in greater detail in FIG. 2. Thus, the data bits received from each cell during each picture field are demodulated/decoded and can be used for a variety of things. In the example, the decoder is equipped with a numerical readout 26 which references a table of pressure point descriptors on the TV screen 16a. Therefore, the viewer of the transmitted messages, in this example can study the physiological names of the indicated pressure points, and read out their associated pressures on the decoder's numerical readout 26.

The system 10 specifically illustrated herein is capable of impressing binary-coded, digital brightness modulation or flicker on any of 192 cells on television receiver screen 16a. More particularly, the television picture frame is divided conceptually into 16 vertical cell columns and 12 horizontal cell rows. Each cell is defined by its column and row coordinates. Thus, for example, cell $A_1$ is defined by column 3 and row 7, while cell $A_4$ is by column 5, row 11.

The digital system 10 is comprised of a data generating section, indicated generally at 32, which generates the coded information for each of the areas or cells. It also includes a cell selection section, indicated generally at 34, which controls the data generating section so that the data for each cell is applied to the transmitter 12 at the proper times so that it appears at the proper cell location on the television receiver screen 16a.

Data generating section 32 consists of a series of data generators, one for each cell. In the illustrated embodiment, the data generators are simply shift registers 36 having a capacity of, for example, eight bits each. Since the picture frame is divided into 192 cells, there are 192 separate shift registers and, being identical, they are all given the same identifying numeral 36. Of course, it is not necessary that there be cells to fill the entire CRT screen and 192 cells is merely a representative number. More or less cells can be used.

Shift pulses are applied to the shift registers. The shift pulses occur at the vertical field rate, i.e., 60 Hz. Accordingly, vertical sync pulses can be used for this purpose. The content of the last (right hand) stages of registers 36 are applied to an OR circuit 38 by way of a series of gates 42, there being one gate 42 for each register. Each vertical sync pulse causes the registers 36 to shift one bit to the right.

Gates 42 are enabled by a pair of signals ($C_x$, $R_x$) from decoders 44 and 46 in the cell selection section 34. Each pair of signals corresponds to the column and row coordinates of a cell on the receiver screen 16a. Thus, for example, the uppermost gate 42 is enabled by a pair of signals, $C_1$, $R_1$ which are present simultaneously only when the electron beam in the television receiver is sweeping through the cell defined by the intersection of column 1, row 1, at the upper left corner of screen 16a. The next lower gate 42 is enabled by signals $C_2$, $R_1$ which are present only when the electron beam is scanning the cell defined by column 2, row 1 and so on down to the lowermost gate 42 which is enabled by signals corresponding to the cell defined by the intersection of column 16, row 12 at the lower right corner of the TV screen.

One or more of the gates 42 may be enabled several times during each field of the television picture (i.e., each 1/60 of a second). The number of times a gate is enabled corresponds to the number of horizontal scan line segments in the particular cell controlled by that gate. Each time a gate is enabled, the content of the last stage of the associated register 36 is applied by way of OR circuit 38 to the transmitter 12, along with the video signals from camera 14.

Registers 36 are of the recirculating variety. Each time the register is shifted, the content of the last register stage is recirculated back to the first register stage by way of a data input section 48. Each input section 48 includes a gate 50 to which is applied the content of the last register stage. Gate 50 is maintained/enabled by a RECIRCULATE signal so that it applies the content of the last register stage via an OR circuit 52 to the first register stage. In this embodiment, the recirculate signal is a plus (+) voltage applied to gate 50 via a switch 56. Switch 56 is automatically or manually timed to turn on the recirculate gate 50 for a predetermined time period, e.g., three seconds.

Each register 36 is loaded initially by way of a gate 58 whose output is also applied to OR circuit 52. The new data is applied serially to the gate 58 and the data is loaded into the register upon the application of a "NEW DATA" command to that gate. The new data in this embodiment is applied to a shift register 36 at the vertical sync rate and shifts through the register and recirculate loop at the rate of one bit per field (1/60 second).

It should be noted that the only cell areas which will contain digital, brightness-modulated data are those that were "loaded" with new data via NEW DATA terminal on gate 58 and were enabled by a logic command via WRITE terminal on gate 58. These control and data signals must be supplied by the program originator for each elemental area on the raster on which a particular digital bit stream is to be located.

As mentioned previously, coded data from the data generating section 32 is impressed on the signal sent from the transmitter 12 in response to selection signals from the cell selection section 34. Section 34 includes an oscillator 60 which oscillates at a frequency which is a multiple of the horizontal sweep frequency $f_H$ of a standard television system (e.g. 15,750 mHz). This multiple corresponds to the number of cell columns one desires to have in the television picture frame. Thus, in the illustrated case, the oscillator frequency is 16 times the horizontal sweep frequency $f_H$.

Oscillator 60 is synchronized (through a standard phase locked loop) by the horizontal sync pulses developed by the transmitting facility and the oscillator output is used to increment a count-of-sixteen counter 62.

The contents of the counter 62, appearing on four data lines, are applied to decoder 44 whose output appears on one of sixteen output lines $C_x$. Each output signal of the decoder 44 has a duration of 1/16 of the horizontal time interval and thus corresponds to one of the sixteen columns in the television picture.

A similar arrangement is provided to define the vertical or row coordinate of each cell. Thus section 34 also includes an oscillator 64 which oscillates at a frequency of twelve times the vertical sweep frequency $f_v$ (e.g. 60 Hz). Oscillator 64 is synchronized by the vertical sync signals provided by the transmitting facility (through a standard phaselocked loop or by countdown from $f_H$) and its output increments a count-of-twelve counter 66.

The output of counter 66 is applied to decoder 46 so that the content of the counter 66 at any given time is indicated by the presence of a signal on one of twelve output lines $R_x$ from the decodeer. Thus, the decoder output provides twelve vertical time intervals, each of a duration equal to 1/12 times the vertical interval and each of which represents one of twelve cell rows in the picture frame.

The decoder 44 and 46 output lines $C_x$, $R_x$ are connected to the various gates 42. During each vertical frame interval, the electrodes apply pairs of enabling signals to selected gates 42 depending upon which of the decoder 44, 46 output lines $C_x$, $R_x$ are energized at that time. For example, if the output lines $C_1$, $R_1$ are energized during the first field interval, section 34 applies $C_1$, $R_1$ signals to the uppermost gate 42, whereupon the data bit in the last stage on the uppermost register 36 modulates the video signal from camera 14 while the electron beam in receiver 16 is sweeping out the cell at the inter-section of column 1 and row 1. Assuming positive video signals, a ONE causes that cell to be relatively bright, a ZERO causes that cell to be relatively dark. Similarly, if the decoder 46 output line $R_7$ is energized along with line $C_3$ from decoder 44, enabling signals are applied to the gate 42 controlling the data applied to the cell $A_1$ at the intersection of column 3 and row 7, and so on.

Each gate 42 is enabled several times during each vertical field interval of the televised picture, depending on the duration of signal $R_x$ and, therefore, the number of scan line segments in the corresponding cell. Each enablement results in the content of the last stage of the associated shift register 36 being summed with the video signal from camera 14 transmitted to the receiver 16 at that time producing a white cell (rectangle) or a logical "ONE" was shifted out; or a dark rectangle if a logical "ZERO" was shifted out of register 36.

Thus, during each vertical field interval, the selection section 34 sweeps from left to right, row-by-row, in synchronism with the electron beam in the camera. As the electron beam sweeps through an area corresponding to the location of each cell, one information bit from the register 36 serving that cell is applied to the modulator so as to add to, or subtract from the white-level brightness of that cell depending on whether a logical "ONE" or "ZERO" is being transmitted.

After the electron beam completes one picture field, the television sync signals initiate the next cycle and the vertical sync pulse shifts registers 36. Whereupon, the second information bit for each cell is applied to control the brightness of that cell at the instant the cell is being scanned by the electron beam. Thus, the shifted output state of each register 36 becomes the modulation for the associated cell in each picture frame. Accordingly, during successive field intervals, each cell has a coded brightness modulation or flicker which corresponds to the information in the associated shift register. Since each register 36 contains eight bits, after eight field intervals, an eight bit coded message can be impressed on each of the 192 cells. Also, the coded information has been recirculated back into each register. Consequently, the same messages can be repeated or new data can be loaded into one or more of the registers via its data input section 48.

At the viewer's end of the system, the coded brightness modulations exhibited in the cells, say cells A1 to A4, are detected by light sensor 22 of which the viewer places against the television screen opposite one of those cells. The light sensor develops corresponding binary-coded, digital electrical signals which are applied to the decoder/demodulator 24 shown in FIG. 2. The messages will be decoded to give the viewer useful information, such as numercial display 26, or a "CORRECT"/"YES" response indication via LED indicator light 70 to viewer's solutions to quiz questions, or, as in the present example, the pressures of the body pressure points.

Figure 2:
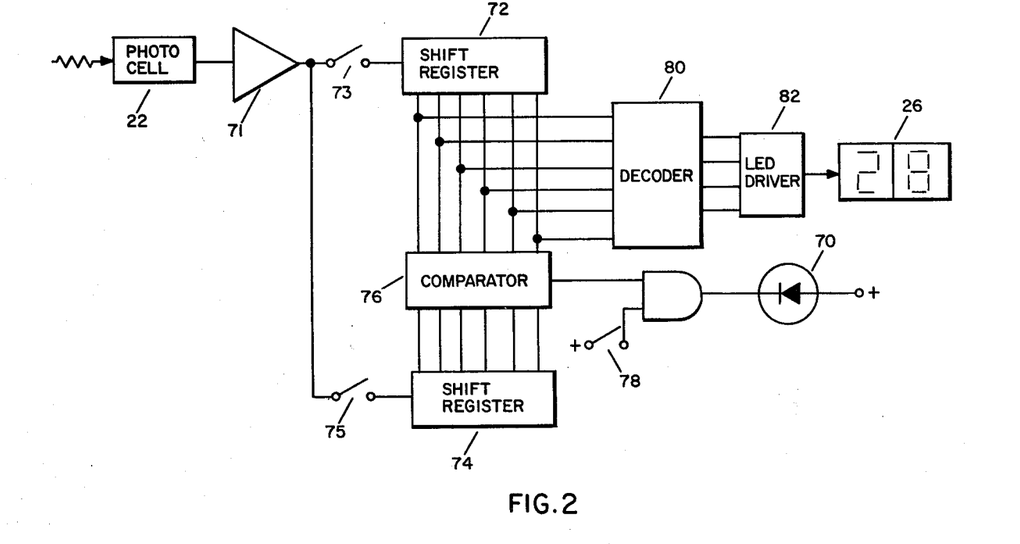
FIG. 2 is a block diagram of one embodiment of a demodulator/decoder employed in the system of FIG. 1.

The operation of decoder/demodulator 24 of this system is simple. As a bit-stream of area-modulated digital words appears under photo sensor 22, these bits are amplified by an amplifier 71 and stored in a standard shift register 72 within decoder/demodulator 24 via a switch 73. From this point on this stored data can be used in ways well-known in the art. For example, as shown in FIg. 2, a stored word in shift register 72 may be compared with a word previously stored via a switch 75 in a shift register 74 which was obtained from another digitally modulated area on the CRT screen. Exact match as determined by a comparator 76 may indicate the correct solution of a quiz question, by way of an example. The "CORRECT"/"YES" indication is obtained by energizing LED indicator light 70, provided switch 78 is closed. Numerical readouts can be obtained by storing a digital word in shift register 72, reading it out into a conventional decoder 80 and lighting up a series of 7-bar numeric light emitting diodes via a driver 82.

The flicker rate in the various cells A1 to A4 is quite rapid, e.g. 60 Hz. While it is detectable by the light sensors 22, and is clearly discernible as a digital code, it is not unpleasant to the human eye so that it does not spoil the viewing of the picture on the TV screen. In many cases, the presence of these blinking spots are useful in attracting attention to a part of the screen where the viewer is expected to carry out some action.

Using the same general arrangement of this system, one or more small areas or cells at an edge of the frame of a conventional commercial television picture can be dedicated to the transmission of data unrelated to the picture. For example, facsimile data including horizontal shift signals in the form of brightness modulations can be impressed on these cells and detected by the viewer using a corresponding number of photosensors positioned opposite the cells. The signals from the photosensors can then be applied to a small decoder and used to control a strip or tabular printer or a facsimile machine to print out stock information, news or other information of general interest. The amount of data that can be transmitted in this fashion can, of course, be maximized by using conventional RZ to NRZ codes.

Using this technique, then, a considerable amount of information can be sent to the television viewers using standard television transmitting and receiving arrangment. Furthermore, this can be accomplished without any increase in the bandwith of the transmitted signal. Also, it can be seen that this can be accomplished without the need for internal changes to the TV receiver or monitor circuits.

In many applications it is desirable to send more data per cell. While the system described in FIGS. 1 and 2 of the drawings is quite adequate for the transfer of low data rate digital transmissions, higher data rates are desired and may be required for many applications. This is particularly true as of the present, when the widespread availability of LSI microprocessors make possible the low-cost manipulation of a substantial amount of digital data.

Figure 3:
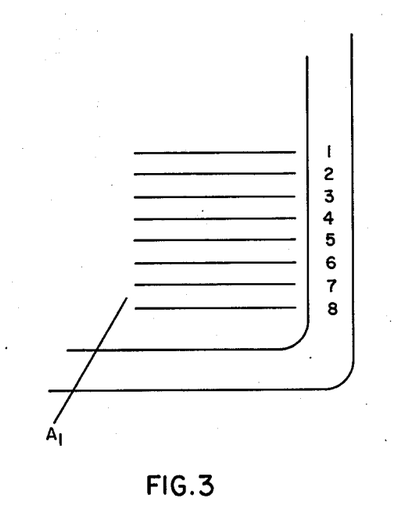
FIG. 3 is an illustration of one means for increasing the data handling rate capability of the system.

Reference to FIG. 3 shows an expansion of the basic cell used in FIG. 1 of the drawings. Note that this cell consists of a series of horizontal line segments, specifically eight lines in FIG. 3. When a photo sensor views a portion of this area, say a square area eight lines high x ¼ inch wide on a 12 inch CRT, its electrical output will be either a single, integrated pulse appearing on once per field in the case of a slowly responding photocell and associated amplifier; or, alternately, using a high speed photo transistor, as a group of eight pulses, approximately 1.2 microseconds wide and repeated at 1/H interval or roughly every 63.5 microseconds, the group recurring in turn at a field rate.

Figure 4:
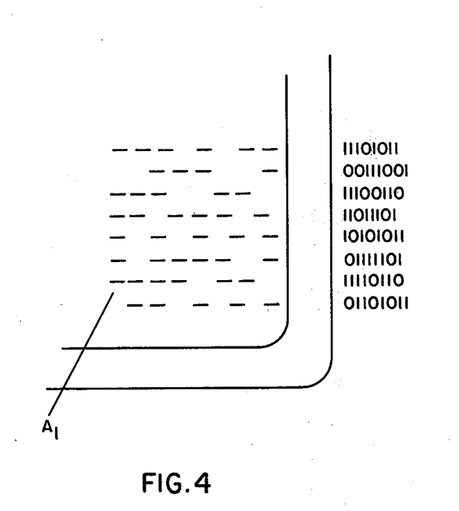
FIG. 4 is an illustration of another means for further increasing the data handling rate capability of the system.

In the still more advanced system of the present invention, which is shown in FIG. 4, each horizontal line segment of the elemental area subtended by the viewing angle of the viewers photo sensor is further segmented into N spot locations along each line as shown in FIG. 4. By way of an example, eight possible spot locations along each horizontal line segment are shown, each of which can be video modulated to appear bright or dark, corresponding respectively to digital "ONES" and "ZEROS." The coded output is shown adjacent the cell therfore, in the example, eight rows of eight bits each, or a total of sixty four data bits can be transmitted to the light sensor 22 during each field. This represents a sixty four times increase in data rate over the basic area-brightness modulation system of FIG. 1.

Figure 5:
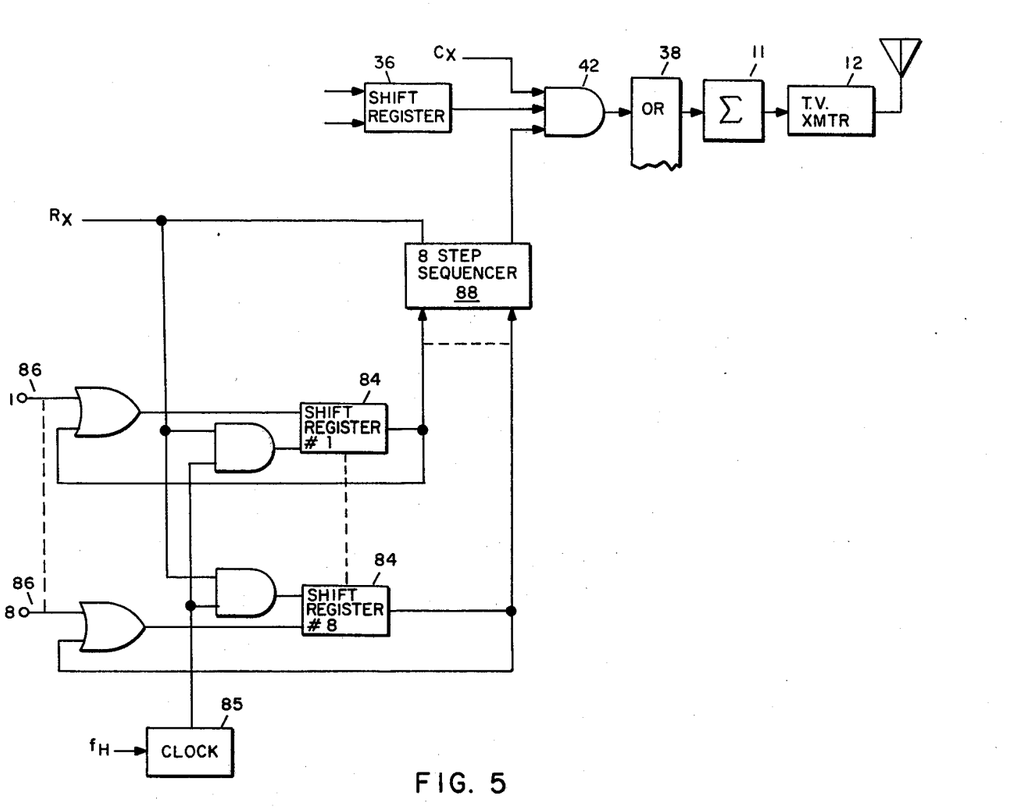
FIg. 5 is a block diagram of a modification of the embodiment of FIG. 1 according to the means of FIG. 4.

A simplified block diagram showing the method for generating an 8 × 8 bit field of binary data is shown in FIG. 5.

FIG. 5 is similar to that of FIG. 1 with the addition of eight shift registers 84 into which the eight data words of eight bits each are stored by the program originator via "new data input lines" 86 and associated circuitry. For clarity most of FIG. 1 is not repeated here only that portion of FIG. 1 necessary to describe this embodiment is shown. During those periods of a horizontal scan period when 1 of 12 decoder 46 first outputs a ONE, an eight step sequencer 88 will pass data word No. 1 from shift register 1 and apply it to AND gate 42. These shift registers are enabled by the $R_x$ signal and shifted by a clock 85 which operates at some multiple of $f_H$ (128 x in this embodiment, or 2,016 MHz), and is phase-locked to $f_H$ to prevent horizontal crawl of the modulated bits along each horizontal line segment. This results in the first line of the selected area having superimposed on it up to eight brightness bits as shown in FIG. 4. For the next seven horizontal lines this process is repeated, except that the sequencer 88 reads data stored in shift register 2, 3 through 8, one line at a time. Thus, all eight lines are now digitally modulated as shown in FIg. 4. In this embodiment shift registers 36 will only store digital ONES, thus, they may be replaced by a single stage shift register or a flip-flop.

For the embodiment of FIg. 3 where only one bit is displayed on a line of a cell the shift register 84 need only store 1 bit (simple flip-flop) and preferably one shift register could be used and it would operate at the horizontal sync rate, the data being applied thereto serially. It is to be noted, that the high speed digital data transmissions system of FIG. 5 is only representative. Technically, the insertion of additional ONES or ZEROS along each transmitted code line segment is a straight-forward task and can be accomplised in many ways. As shown above, pulses from a source (usually obtainable within the sync generation system) of say $2^8$ or 128 x horizontal line frequency, are used as a clock which is used to synchronize data to be transmitted. It must merely gate this data in 8-bit segments into gate 42 of FIG. 1 and FIG. 5. This adds the required brightness modulation to each horizontal line segment. At the same time, the system of FIG. 1 is used both to define the location of the 8-line data group of our example, and in practice can also be used to control the generation and placement of a square, black background under the brightness modulation codes being transmitted. If these black areas are made large enough, a considerable degree of protection against pickup of unwanted stray signals by the photosensor can be achieved in practical embodiment of the present invention.

Figure 6:
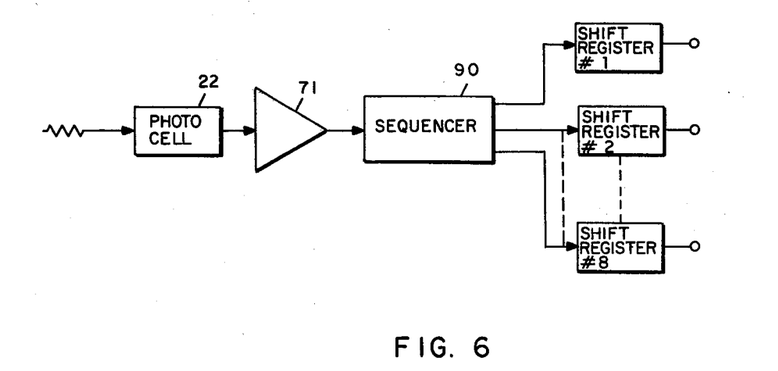
FIG. 6 is a block diagram of one embodiment of a demodulator/decoder employed in conjunction with the system of FIG. 5.

At the receiving end shown by way of example in FIg. 6, photosensor 22 is used to pick up the information content of the array of digital brightness modulated codes shown in FIG. 5 the drawings. A sequencer 90 is initiated by the first ONE intercepted in the first of eight lines and is employed in recognize lines 1, 2, 3, 4, 5, 6, 7 and 8 as eight distinct 8-bit digital words. These words stored sequentially in eight shift register 92. Thus, eight distinct digital 8-bit words could thus be transmitted and decoded at the viewing end at the vertical field rate of 60 per second, which is standard in the U.S. representing a digital transmission rate of 60 × 64 = 3840 bits per second.

This relatively high data rate is capable of conveying a considerable amount of data. This is true even if some of these bits are used for housekeeping (start and parity bits). Viewing-end applications such as those descirbed above are, therefore, no longer restricted to relative simple, slow and frequently trivial operations; together with presently available, low-cost LSI logic components, the high-speed features of the invention open up entirely new uses in teaching, entertainment, surveillance, remote control, document transmission and many other applications. The demodulated/decoded bit-stream can be used to access external equipment (calculators, counter, computer, pointer, alphanumeric character generator for CRT display, audio tape recorder for storage, permanent record or transmission via phone line with data added by viewer) and associated pictorial details shown on screen with particular binary-coded, digital video brightness modulation cells. For example, the program originator can place coded spots anywhere on screen, and viewer can address any spot at will. Thus, it is to be understood that the embodiments shown are to be regarded as illustrative only, and that many variations and modifications may be made without departing from the principles of the invention herein disclosed and defined by the appended claims.

I claim:

1. A system for communicating a binary-coded, digital message from a message originating source to a raster scan display, comprising:
    synchronization means including means for generating raster scan vertical and horizontal synchronization signals;
    means for generating message signals corresponding to a binarycoded, digital message at a rate greater than the vertical synchronization rate;
    means for generating composite video signals including said synchronization signals and said message signals representing a raster scan picture on a raster scan display;
    means for applying the message signals to the composite video signal generating means in timed relation to the synchronization signals so that the message appears as binary-coded, digital brightness modulation at a rate greater than the vertical synchronization rate in one or more viewing areas of the raster scan display picture;
    a raster scan display for receiving the composite video signals; and
    means at the display for optically detecting the brightness modulation in the areas of the raster scan display picture.

2. The system defined in claim 1, further including:
    a standard raster scan camera connected to apply video signals to the composite video signal generating means.

3. Apparatus as defined in claim 1, further including means for decoding the detected brightness modulation.

4. Apparatus as defined in claim 3, further including means for providing a visual indication of the decoded message.

5. Apparatus as defined in claim 3, further including storage means coupled to said decoding means.

6. Apparatus as defined in claim 5, further including means coupled to said storage means for comparing sequential detected messages.

7. The system defined in claim 1 wherein the detecting means includes at least one light sensors which when positioned opposite a said area develop binarycoded, digital electrical signals corresponding to the brightness modulation in that area.

8. The system defined in claim 7, further including means for storing the outputs of the light sensors.

9. The system defined in claim 1 wherein the message signal applying means comprise means responsive to the synchronization signals for causing the binary-coded, digital message signal generating means to deliver a message signal to the composite video signal generating means when the electron beam in the raster scan display is scanning each said viewing area.

10. The system defined in claim 9 wherein the message signal applying means, includes:
    a first counter synchronized to the horizontal synchronization signals so that the count in the first counter at any given time corresponds to the horizontal position of the electron beam in the raster scan display at that time;
    a second counter synchronized to the vertical synchronization signals so that the count in the second counter at any given time corresponds to the vertical position of said electron beam at that time whereby the count in both counters at any time define a unique location in the raster scan display picture field; and means responsive to the counts in said counters for applying a control signal to the message signal generating means so that a message signal is communicated as the electron beam is scanning the viewing area field location defined by the counts in both counters at that time.

11. The system defined in claim 9 wherein the responsive means also include:

a pair of oscillators which oscillate at frequencies which are integral multiples of the vertical and horizontal synchronization signals; and means coupled to said oscillators for generating signals representing discrete areas of the display picture where a message can appear.

12. The system defined in claim 1 wherein said applying means occasions each line of one of said areas of the display picture to contain one unique bit of information.

13. The system defined in claim 1 wherein said applying means occasions each line of one of said areas of the display picture to contain a digital word comprising a plurality of unique bits of information.

14. The system defined in claim 1 wherein said message originating source comprises a prerecorded video storage means.

15. A method of communicating binary-coded, digital messages from a message originating source to a raster scan display, comprising the steps of:

generating message signals corresponding to a binary-coded digital message;

generating vertical and horizontal synchronization signals;

combining the message signals and synchronization signals to generate a composite signal;

applying the message signals to generate the composite signal at a rate greater than the vertical synchronization rate;

displaying the message signals in one or more viewing areas of a raster scan display as a brightness modulation; and optically detecting the brightness modulation.

16. The method of claim 15 further including the step of recording the message signals and the synchronization signals on a video recording means.

17. A system for providing display of a binary-coded, digital message spatially related to a displayed video program presentation on a raster scan display, comprising:

synchronization means including means for generating raster scan vertical and horizontal synchronization signals;

means for generating message signals corresponding to the digital coded message to be displayed;

means for generating signals corresponding to a video program presentation;

means for generating composite video signals including said synchronizing signals, said message signals and said video program presentation signals; and means for applying the message signals to the composite video signal generating means in timed relation to the synchronization signals so that the message appears as binary-coded, digital brightness modulation in one or 15 more predetermined areas of the raster scan display picture spatially related to the video program presentation.

18. The system defined in claim 17 further including:

a raster scan display for receiving the composite video signals; and a hand held light sensor for selecting interrogating the binary-coded digital brightness modulation in one or more areas of the raster scan display.

* * * * *

UNITED STATES PATENT OFFICE
CERTIFICATE OF CORRECTION

PATENT NO. : 3,993,861
DATED : November 23, 1976
INVENTOR(S) : Ralph H. Baer

It is certified that error appears in the above-identified patent and that said Letters Patent are hereby corrected as shown below:

Column 12, line 30 before "more" delete "15"

Signed and Sealed this

First Day of February 1977

[SEAL]

Attest:

RUTH C. MASON
*Attesting Officer*

C. MARSHALL DANN
*Commissioner of Patents and Trademarks*